United States Patent
Cittadini et al.

(10) Patent No.: US 6,173,533 B1
(45) Date of Patent: Jan. 16, 2001

(54) MAGNETIC WEATHER STRIP FOR WINDOW AND DOOR FRAMES

(75) Inventors: Paolo Cittadini, Luvinate; Alfonso Caldiroli, Legnano, both of (IT)

(73) Assignee: Industrie Ilpea S.p.A (IT)

( * ) Notice: Under 35 U.S.C. 154(b), the term of this patent shall be extended for 0 days.

(21) Appl. No.: 09/171,398

(22) PCT Filed: Apr. 30, 1996

(86) PCT No.: PCT/IT96/00087

§ 371 Date: Oct. 16, 1998

§ 102(e) Date: Oct. 16, 1998

(87) PCT Pub. No.: WO97/41327

PCT Pub. Date: Nov. 6, 1997

(51) Int. Cl.[7] .................................................. E06B 7/16
(52) U.S. Cl. ........................ 49/478.1; 49/489.1; 49/496.1
(58) Field of Search ................................. 49/478.1, 475.1, 49/489.1, 496.1

(56) References Cited

U.S. PATENT DOCUMENTS

| | | | |
|---|---|---|---|
| 3,055,193 | * | 9/1962 | Smith .............................. 49/478.1 X |
| 3,075,258 | * | 1/1963 | Petkwitz .............................. 49/478.1 |
| 3,077,644 | * | 2/1963 | Kesling .............................. 49/478.1 X |
| 3,137,900 | * | 6/1964 | Carbary .............................. 49/478.1 |
| 3,159,885 | * | 12/1964 | Cowles .............................. 49/478.1 |
| 3,238,573 | | 3/1966 | Pease, Jr. . |
| 3,248,159 | * | 4/1966 | Hall .............................. 49/478.1 X |
| 3,378,957 | * | 4/1968 | Frehse .............................. 49/478.1 |
| 3,604,152 | * | 9/1971 | Protzman .............................. 49/478.1 X |
| 4,138,049 | | 2/1979 | McAlrney . |
| 4,413,446 | | 11/1983 | Dittrich . |
| 5,129,184 | * | 7/1992 | Fish .............................. 49/478.1 |

FOREIGN PATENT DOCUMENTS

| | | |
|---|---|---|
| 9006323 | 8/1990 | (DE) . |
| 0397300 | 11/1990 | (EP) . |
| PCT/EP92/ 02651 | 6/1993 | (EP) . |
| 2545145 | 11/1984 | (FR) . |

* cited by examiner

*Primary Examiner*—Daniel P. Stodola
*Assistant Examiner*—Hugh B. Thompson
(74) *Attorney, Agent, or Firm*—Robert F. I. Conte; Lee, Mann, Smith, McWilliams, Sweeney & Ohlson

(57) ABSTRACT

A weather strip in particular for window and door frames having a base portion (2) arranged to be engaged in a respective anchoring area (3) of a first bearing frame (4). A head portion (5) of the weather strip is arranged to act against an abutment area (6) associated with the a second bearing frame (7). A band of magnetic material (8) is associated with the head portion, and there is an intermediate connecting portion (9) formed, in transverse section, by a single fillet element connecting the head portion with the base portion.

15 Claims, 3 Drawing Sheets

MAGNETIC WEATHER STRIP FOR WINDOW AND DOOR FRAMES

DESCRIPTION

The present invention relates to a weather strip, in particular for window and door frames and the like.

It is known that in the field of external window and door frames, in that of motor-vehicles and in many other fields, weather strips designed to ensure an appropriate seal against atmospheric agents such as air, water or others are widely used.

In particular, the weather strips referred to in the present description have an extension and shape adapted to match the opening contour with which they are associated and, under operating conditions, they are interposed between a fixed portion such as a door or window frame or a car body, and a movable portion, such as the movable framework of a door or window or a vehicle door.

As mentioned above, weather strips having differentiated structures, conformations and working conditions have been made in the past, depending on the different requirements. More particularly, one known type of weather strip consists of the so-called compression strip. It includes a base portion intended for fitting into a corresponding seat of one of the frames with which the strip is associated, and a head portion which, under working conditions, is deformed by compression and therefore implements the necessary sealing action.

While the compression strips briefly described above are presently employed in many applications, they however have a great number of drawbacks above all from an operating point of view.

It is to note in fact that, even if rather valuable materials are used in the strip manufacture, when said materials are submitted to compression, a compression set is caused, that is the material is unable to completely and resiliently recover the bearing strain to which it has been subjected.

Clearly, these drawbacks, the presence of which increasingly grows in time, partly or completely impair the sealing capabilities of the strip.

It should be also noted that, taking into account the materials usually employed in manufacturing said strips, important problems exist in connection with aging and stiffening of the strip that, as time goes by, will become increasingly more unable to resiliently respond to the stresses to which it is submitted, in particular at corner areas. As a result, a reduction and a decay in the sealing capabilities of the strip occurs, which makes it necessary to replace the strip itself at predetermined intervals.

In addition to the above, it is to point out that, given the typology of said strips, working tolerances are to be respected with great accuracy in order to ensure a specific contact pressure substantially uniform over the whole perimeter to be sealed.

Furthermore, the compression strips are substantially unable to carry out and ensure an appropriate sealing when the openings to be sealed have tortuous shapes or corner areas where particularly sharp edges are present.

Then said compression strips, still due to their structural conformation, need a great closing strength capable of deforming the head portion of the strip itself so as to generate an appropriate specific contact pressure along the whole perimeter of the opening to be sealed.

Finally, it will be recognized that pressure strips cannot cause locking of a closure without the presence of a mechanical lock which must necessarily act in combination with the strip itself.

In order to overcome the above mentioned drawbacks at least partly, the same Applicant has already developed a second type of weather strip suitable both for building applications such as door and window frames for example, and applications to motor-vehicles, such as doors, hatchback doors, hoods or other movable parts of the car bodies, as well as for other similar applications.

In accordance with the last-mentioned typology, the weather strip is provided to comprise a head portion with which a band of magnetic material is associated. The head portion is them connected to a base or shoe portion of the weather strip by a tubular body or a bellows-shaped body capable of ensuring some mobility to the head portion. In this manner, the drawbacks typical of compression strips are reduced and a better adaptability to shapes of any conformation is ensured together with a greater reliability in time, due to the absence of a portion of strip acting under compression, and an easier setting up of the weather strip itself, since the latter does not need any mechanical lock and in addition no particular closing strength is required, because the sealing portion is biased against the corresponding abutment element by the attraction force caused by the insert made of ferromagnetic material.

While the above described weather strips provided with a magnetic insert appear to be greatly effective and widely imposed on the market, they however have shown some working aspects that, in the Applicant's opinion, are still susceptible of further improvement.

In particular, the magnetic-insert strips have involved some problems due to the particular conformation of the connecting portion between the head portion and the base portion of the strip itself.

More specifically, since the connecting portion is in the form of a tube or bellows, great difficulties arise on installation, when junctions between two straight portions of said strips are to be made at the corner areas.

In addition, due to the particular conformation of the connecting portion, the head portion appears to be linked to the base portion too stiffly. For this reason, the head portion has a weak mobility relative to the base portion and is therefore only limitedly capable of following the profile of the opening to be sealed.

Under this situation, it is a fundamental aim of the present invention to provide a weather strip that is of easy and ready installation while at the same time ensuring the greatest mobility to the head portion so as to achieve an excellent operating efficiency.

The foregoing and further objects that will become more apparent in the progress of the present description are substantially achieved by a weather strip in particular for window and door frames, as defined in the appended claims.

This description will be taken hereinafter with reference to the accompanying drawings given by way of non-limiting example, in which.

Figure 1:
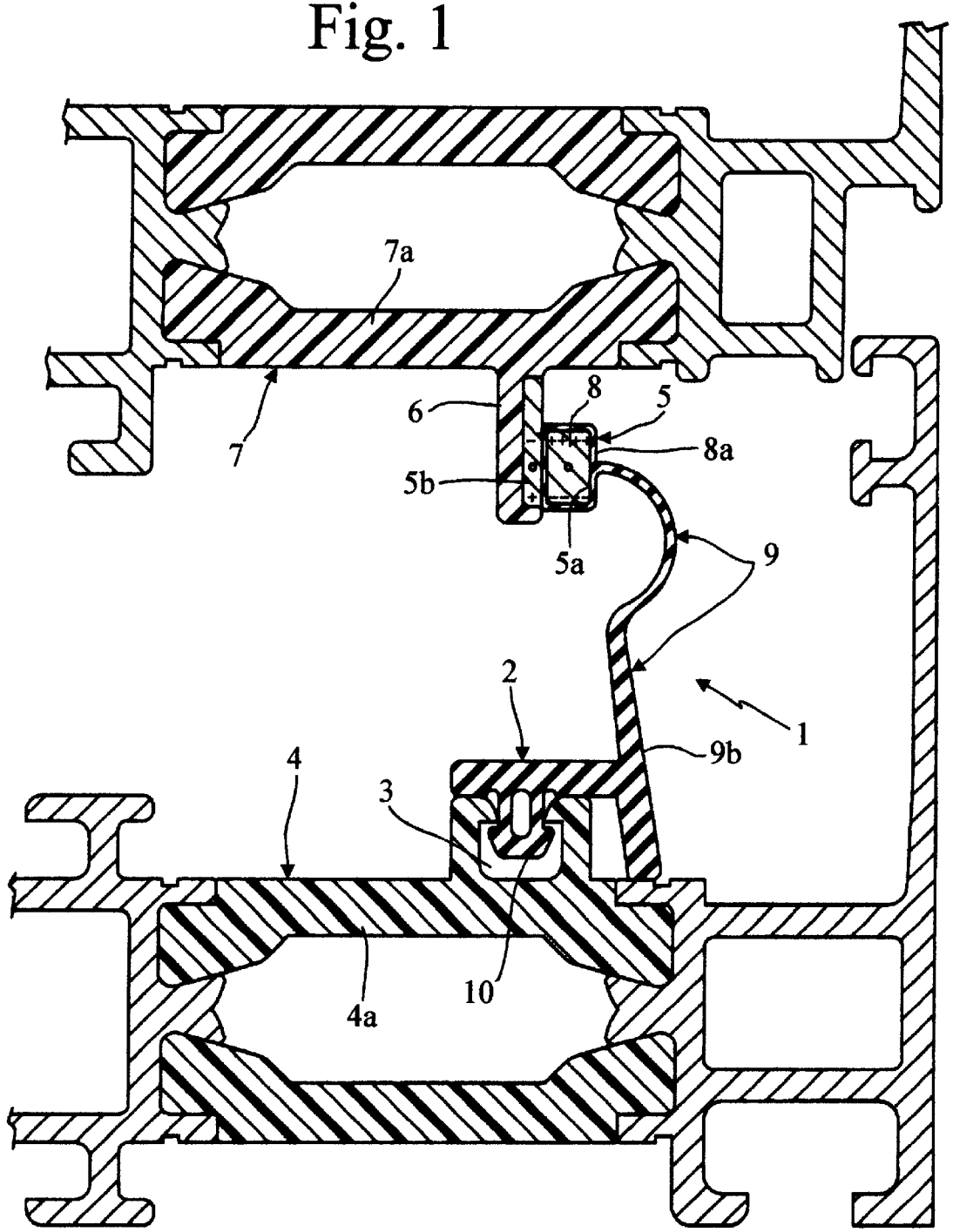
FIG. 1 is an enlarged cross-sectional view of the weather strip of the invention under operating conditions.

Referring to the drawings, a weather strip in particular for window and door frames and the like, in accordance with the present invention, has been generally identified by reference numeral 1.

The weather strip 1 comprises a base portion 2 intended for engagement with a respective anchoring area 3 associated with a first bearing frame of a door or window fixture for example, generally denoted by 4.

In this specific case the anchoring area 3 is formed at a thermal insulating element 4a associated with the first frame 4. The first frame 4 is shiftable from an open position (not shown) to a closed position (shown in FIG. 1) in which the weather strip 1 carries out a convenient seal from atmospheric agents.

It is to point out that for the purpose strip 1 comprise a head portion 5 arranged to act against an abutment area 6 associated with a second bearing frame generally identified by 7. In this case too the abutment area 6 is actually defined at a thermal insulating element 7a being part of the second bearing frame 7. A band of magnetic material 8 engaged in a longitudinal seat 5a formed in the head portion 5 is then operatively associated with the head portion 5.

Preferably, the head portion 5 may have a tubular conformation so as to define a longitudinal seat 5a of a parallelepiped or square conformation for example, as shown in the drawings, or also an open conformation, in which case the band of magnetic material will be received thereinto by forced fitting or formed therein by coating through an extrusion or coextrusion process.

Figure 2:
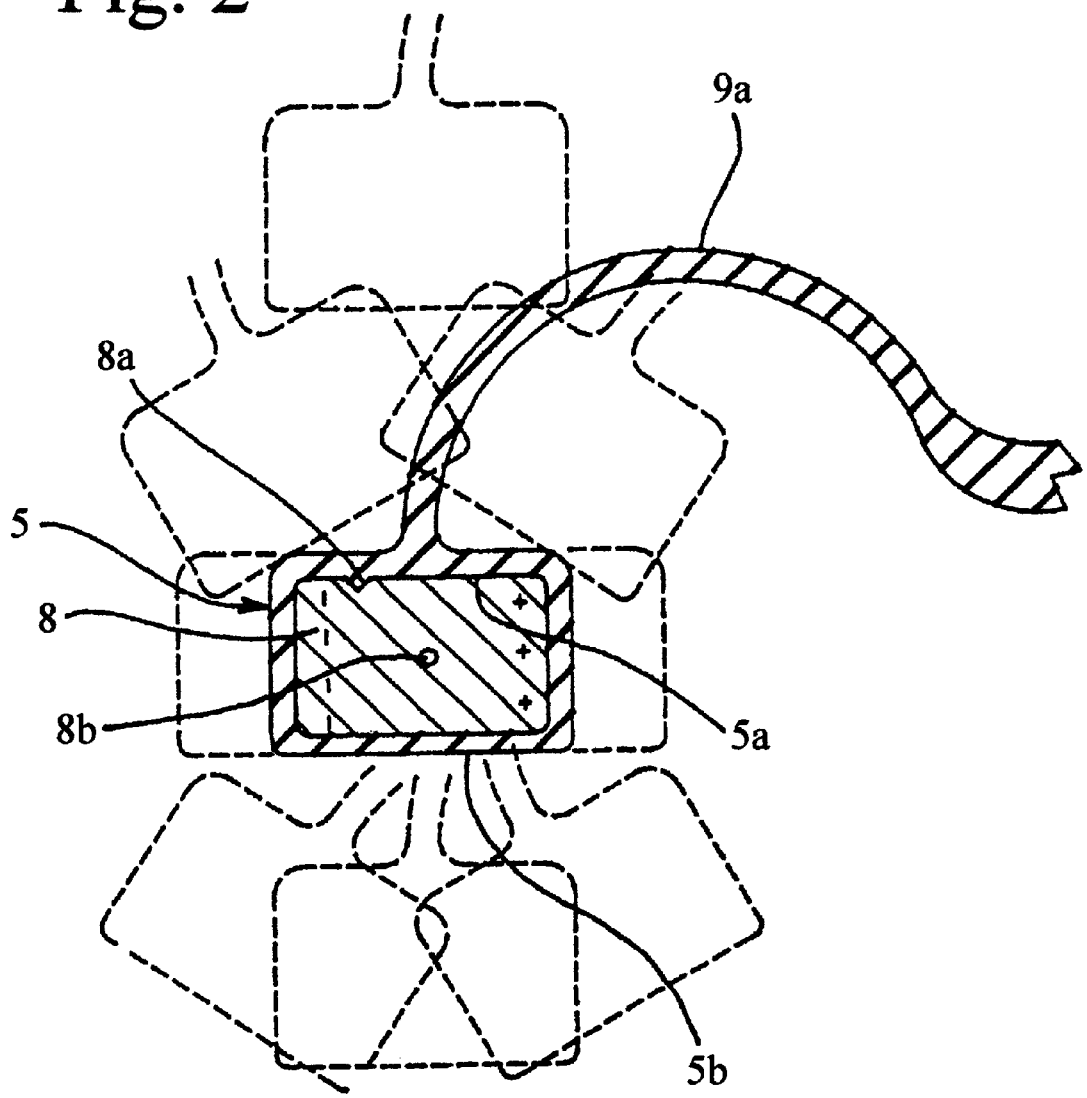
FIG. 2 is a cross-sectional view similar to that in FIG. 1 showing a strip portion and diagrammatically depicting the possible movements to which the head portion of the strip itself can be subjected.
Figure 2:
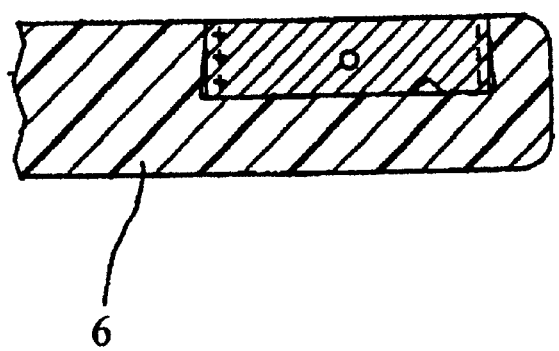
Figure 3:
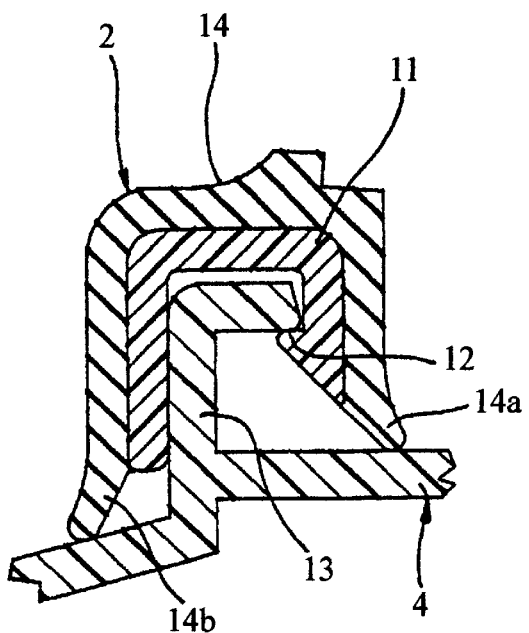
FIGS. 3 to 6 show different envisaged solutions for the strip base portion in accordance with the present invention.

As clearly seen in the drawings, the head portion 5 is then physically connected to the base portion 2 by an intermediate connecting portion 9 which, in an original manner, is defined in cross section by a single fillet element having at least one unstraight portion 9a. This fillet element is capable of bending and extending to move the head portion 5 from a rest position (see FIG. 2) to a plurality of operating positions located at a given distance from said rest position in any movement directions.

Preferably this unstraight portion is in the form of an arc of a circumference and the thickness of same is substantially constant.

In this manner the unstraight portion 9a will be able to extend and ben in a substantially homogeneous manner following the attraction exerted thereon by the magnetic means 8, which will make it fit any shape of the abutment area 6 very easily, even in the presence of important working errors and/or tolerances and also in the case of areas having a very reduced radius of curvature. It will be recognized that due to its particular structure, portion 9a will be practically subjected to tensile stresses, possible compression-set effects being substantially eliminated.

Said fillet element defining the intermediate connecting portion further comprises at least one straight portion 9b interposed between the base portion 2 and the unstraight portion 9a. This straight portion 9b is of a gradually decreasing thickness away from the base portion 2 for connection with the unstraight portion.

Advnatageously, the straight portion 9b defines a preferential direction according to which the unstraight portion is disposed, although it does not restrain the overall deformation and extension capabilities to which the intermediate connecting portion 9 may be subjected.

In other words, under operating conditions, the straight portion 9b ensures a certain directional positioning of the unstraight portion 9a so that the head portion 5 is disposed close to an area substantially in the vicinity of the abutment area 6. Then, by effect of the magnetic interaction between the magnetic bend 8 and the abutment portion 6 which have a magnetic element inserted therein (as shown in FIG. 1), the intermediate portion is deformed so that the head portion is brought to bear against the abutment element 6. Advantageously, said head portion comprises at least one operating holding area 5b arranged to act against said abutment area 6 and preferably having a planar conformation. In addition, in order to ensure a precise positioning of the head portion 5, the magnetic charges of the band 8 are arranged in such a manner that the opposite poles are located at the opposite ends of the operating holding area 5b. In this way, by arranging on the abutment area 6 a magnetic element the poles of which are disposed as shown in FIG. 1, the head portion can approach the abutment area in an efficient manner and a precise positioning of said head portion against the abutment area is achieved.

Since the magnetic poles of the band 8 need to be conveniently positioned, said band is provided with at least one longitudinal notch 8a intended for polarity recognition.

Finally, still with reference to the magnetic band 8, it is to note that it is provided with means 8b arranged to prevent axial expansions or contractions of same due to sudden changes of temperature that could impair or alter the operating efficiency of the weather strip. More particularly, the means 8b comprises at least one elongated element consisting of for example a cord of metal material or synthetic fibre such as fiberglass, which is incorporated into the magnetic band 8 preferably at a central symmetry axis thereof.

Figure 4:
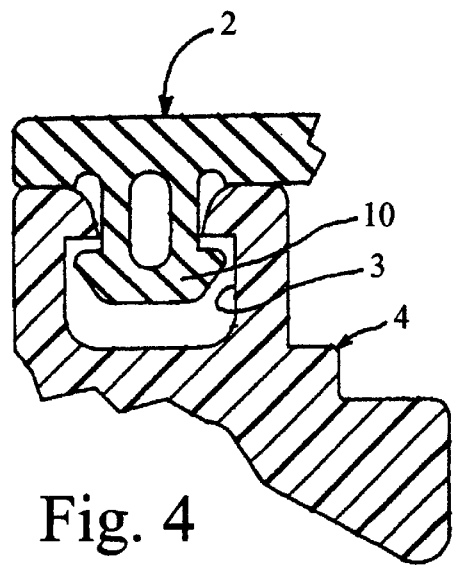
Figure 5:
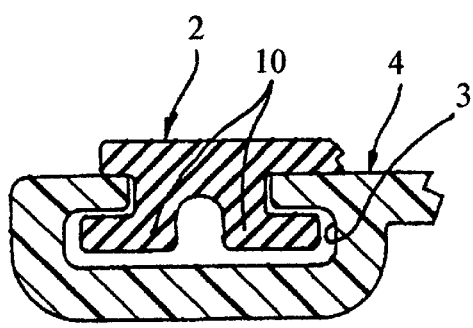
Figure 6:
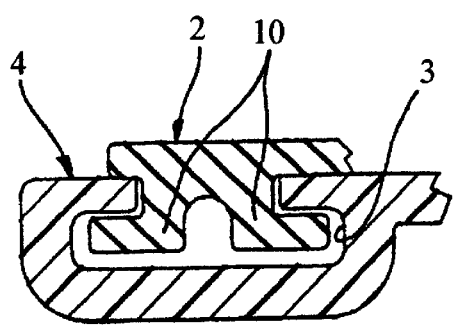

Referring now to FIGS. 3 to 6 in detail, it is noted that the base portion 2 of the weather strip 1 can comprise an anchoring element 10 to be pressure-fitted into a corresponding longitudinal housing formed in said first frame 4, as shown in particular in the embodiments in FIGS. 4, 5 and 6.

Alternatively it is also advantageously provided that the base portion 2 (see FIG. 3) may comprise a coupling element 11 defining at least one undercut 12 to receive in engagement a corresponding relief formed in the anchoring area 3 of said first frame 4, as well as a spring-thrust element 14 operatively associated with said coupling element 11 and having at least a first end portion 14a arranged to act, under operating conditions, against said first frame 4 and to transmit a corresponding spring force to said coupling element to cause the same to be anchored to the relief 13.

Preferably, the spring-thrust element 14 is disposed perimetrically to the coupling element 11 and has a second end portion 14b located at a substantially symmetric and opposite position with respect to the first portion 14a, which second end portion is also intended for acting, under operating conditions, against said first frame 4. Practically, the two end portions 14a and 14b succeed in generating a sufficient elastic thrust force on the coupling element so as to fixedly anchor it to the relief 13. It is pointed out that in order that the spring-thrust element may be able to conveniently perform its technical task, it must be made of a soft and elastically deformable material such as an elastomer for example, whereas element 11 is to be made of a stiff material such as a plastic or metal material.

Obviously, the structure of the base portion 2 described above and shown in FIG. 3 can be applied to advantage to any weather strips, of the conventional type as well, for example a compression strip or any other type, and application of this structure is not restrained to strips of the type described with reference to the present invention.

Finally, as regards materials, the weather strip can be also made of thermoplastic, thermosetting or elastomer materials.

The invention achieves important advantages.

First of all it is to note that due to the particular conformation of the intermediate connecting portion 9 the inventive weather strip is capable of ensuring a perfect seal even when broad working tolerances are concerned and can be employed in those cases in which openings having very tortuous shapes need to be sealed.

In fact, the degree of mobility achieved by the head portion 5 has never been reached until now and therefore said head portion is capable of following any type of contour. In addition, by virtue of the particular arrangement of the magnetic charges in the magnetic band 8, said strip head portion can abut against the respective mating portion in a very precise manner, reaching the desired operating position without the occurrence of jammings, thereby ensuring a very high operating reliability.

Furthermore, due to the presence of an intermediate connecting portion consisting of a single fillet element, junctions at the corners can be carried out in a very simple and precise manner and without involving the usual assembling problems during the installation step that are typical of weather strips of known type.

Finally, from the point of view of production, the weather strip 1 in accordance with the invention is of easy manufacture as it can be made by an continuous extrusion process; as a result, material saving occurs with respect to the magnetic strips having an intermediate connecting portion in the form of a tube or bellows, for example. Furthermore, the weather strip in question is substantially subjected, under any operating condition, to tensile stresses alone, so that all problems connected with a compression-set effect are eliminated.

Obviously, many modifications and variation may be made to the invention as conceived, all of them falling within the scope of the inventive idea characterizing it.

What is claimed is:

1. A weather strip for window and door frames, comprising:
    a base portion (2) arranged to be engaged in an anchoring area (3) of a first bearing frame (4);
    a head portion (5) having at least one operating holding area (5*b*) to act against and abutment area (6) associated with a second bearing frame (7);
    a band of magnetic material (8) in a longitudinal seat (5*a*) formed in said head portion (5); and
    a non-tubular intermediate connecting portion (9) between said base and head portions, said intermediate portion (9) in section is defined by a single fillet element having at least one unstraight bendable portion (9*a*) in the form of an arc and a substantially straight portion (9*b*), said bendable portion extending substantially centrally from said head portion, said straight portion extending from only one side of said base portion, said straight portion has a gradually decreasing thickness away from said base portion, said fillet elements is capable of bending and extending to move the head portion (5), along any direction, from a rest position to a plurality of operating positions located at a given distance from said rest position and the magnetic charges of said band are disposed in such a manner that the opposite poles are located at the opposite ends of said operating holding area (5*b*) and are adapted to act on a magnetic element arranged on the abutment area (6), said head portion and said base portion being interconnected only by said fillet element.

2. A weather strip according to claim 1, wherein said unstraight portion (9*a*) substantially has constant thickness.

3. A weather strip according to claim 1, wherein said head portion (5) has a tubular conformation to define a longitudinale seat (5*a*) in the form of a prism.

4. A weather strip according to claim 1, wherein said operating holding area (5*b*) is of a planar conformation.

5. A weather strip according to claim 1, wherein said band of magnetic material (8) comprises at least one longitudinal notch (8*a*) intended for polarity recognition.

6. A weather strip according to claim 1, wherein said band (8) is operatively associated with means (8*b*) for preventing axial expansions/contractions of said band.

7. A weather strip according to claim 6, wherein said means (8*b*) comprises at least one elongated element incorporated in said band.

8. A weather strip according to claim 7, wherein said elongated element comprises at least one cord of a metal material or a synthetic fibre disposed close to a central symmetry axis of said band of magnetic material (8).

9. A weather strip according to claim 1, wherein said base portion (2) comprises an anchoring element (10) to be pressure-fitted in a corresponding longitudinal housing formed in said first frame at said anchoring area (3).

10. A weather strip according to claim 1, wherein said base portion comprises:
    a coupling element (11) defining at least one undercut (12) to receive in engagement a corresponding relief (13) formed on said first frame (4); and
    a spring-thrust element (14) operatively associated with said coupling element and having at least a first end portion (14*a*) arranged to act, under operating conditions, against said first frame and to transmit a corresponding spring force to said coupling element (11) to cause anchoring of same to said relief (13).

11. A weather strip according to claim 10, wherein said spring-thrust element (14) is disposed perimetrically to said coupling element (11).

12. A weather strip according to claim 10, wherein said spring-thrust element (14) has a second end portion (14*b*) disposed in a substantially symmetrically opposite position in respect of said first end portion (14*a*), which second portion too is arranged to act, under operating conditions, against said first frame (4).

13. A weather strip according to claim 10, wherein said spring-thrust element (14) is made of an elastically deformable soft material.

14. A weather strip according to claim 10, wherein said coupling element (11) is made of a stiff material.

15. A weather strip for window and door frames comprising:
    a base portion (2) adapted to be engaged in an respective anchoring area (3) of a first bearing frame (4);
    a head portion (5) having at least one operating holding area (5*b*), said holding area (5*b*) adapted to act against an abutment area (6) on a second bearing frame (7);
    a band of magnetic material (8) connected to said head portion (5); and
    a non-tubular intermediate connecting portion (9) between said base portion and said head portions, said intermediate portion (9) having a single first terminal area integral to only one side of the base portion and a single second terminal area integral to only a central portion of the head portion, said intermediate portion in transverse section being a single fillet element extending between said first and second terminal areas on said element having at least one unstraight bendable portion (9*a*) in the form of an arc and a substantially straight portion (9*b*), said bendable portion extending substantially centrally from said head portion, said straight portion extending from only one side of said base portion, said straight portion has a gradually decreasing thickness away from said base portion, said bendable portion providing movement of said head portion (5), along any direction, from a rest position to a plurality of operating positions located at a given distance from said rest position and the magnetic charges of said band being disposed in such a manner that opposite magnetic poles of said band are located at the opposite ends of said operating holding area (5*b*) to act on a magnetic element on the abutment area (6), said head portion and said base portion being reciprocally connected by only said intermediate portion (9).

\* \* \* \* \*